(12) United States Patent
Hempstead et al.

(10) Patent No.: US 7,092,958 B2
(45) Date of Patent: Aug. 15, 2006

(54) KNOWLEDGE INFORMATION MANAGEMENT TOOLKIT AND METHOD

(75) Inventors: Antoinette R. Hempstead, Idaho Falls, ID (US); Kenneth L. Brown, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 551 days.

(21) Appl. No.: 10/354,328

(22) Filed: Jan. 29, 2003

(65) Prior Publication Data

US 2004/0148304 A1 Jul. 29, 2004

(51) Int. Cl.
G06F 17/30 (2006.01)
G06F 3/00 (2006.01)
G10L 21/00 (2006.01)

(52) U.S. Cl. .............. 707/102; 707/10; 707/101; 707/200; 704/270; 704/275; 719/316

(58) Field of Classification Search ............ 707/1, 707/5, 10, 200, 203, 101, 102; 704/270, 704/275; 715/513; 719/316
See application file for complete search history.

(56) References Cited

U.S. PATENT DOCUMENTS

| | | | |
|---|---|---|---|
| 5,649,190 A * | 7/1997 | Sharif-Askary et al. .... | 707/101 |
| 5,732,270 A * | 3/1998 | Foody et al. ............... | 719/316 |
| 6,311,159 B1 * | 10/2001 | Van Tichelen et al. ..... | 704/275 |
| 6,349,343 B1 * | 2/2002 | Foody et al. ............... | 719/316 |
| 6,405,197 B1 * | 6/2002 | Gilmour ....................... | 707/5 |
| 6,585,777 B1 * | 7/2003 | Ramaley et al. ............ | 715/513 |
| 6,647,384 B1 * | 11/2003 | Gilmour ....................... | 707/5 |

OTHER PUBLICATIONS

Panchapagesan, Bhujanga et al., The INEEL Data Integration Mediation System, May 1997.
Dean, Lynn et al., Data Integration Mediation System, Feb. 28, 2001.

* cited by examiner

*Primary Examiner*—Shahid Alam
(74) *Attorney, Agent, or Firm*—Wells St. John, P.S.

(57) ABSTRACT

A system is provided for managing user entry and/or modification of knowledge information into a knowledge base file having an integrator support component and a data source access support component. The system includes processing circuitry, memory, a user interface, and a knowledge base toolkit. The memory communicates with the processing circuitry and is configured to store at least one knowledge base. The user interface communicates with the processing circuitry and is configured for user entry and/or modification of knowledge pieces within a knowledge base. The knowledge base toolkit is configured for converting knowledge in at least one knowledge base from a first knowledge base form into a second knowledge base form. A method is also provided.

28 Claims, 6 Drawing Sheets

KNOWLEDGE INFORMATION MANAGEMENT TOOLKIT AND METHOD

CONTRACTUAL ORIGIN OF THE INVENTION

The United States Government has certain rights in the following invention pursuant to Contract No. DE-AC07-99ID13727 between the U.S. Department of Energy and Bechtel BWXT Idaho, LLC.

TECHNICAL FIELD

The present invention pertains to systems and methods for integrating data from disparate and distributed data sources. More particularly, the present invention relates to toolkits and methods for entering and/or modifying the knowledge for integrating disparate and distributed data sources independent of the platform or domain of the systems.

BACKGROUND OF THE INVENTION

Businesses worldwide store information in databases, including Fortune 500 companies, as well as small and mid-size enterprises. However, there is a problem in that independent and heterogeneous databases are used to store application data for businesses. In essence, data and processes are locked away in legacy and incumbent information systems for each business. Each business stores valuable data and processes knowledge in a manner that is dependent of location and/or format.

Businesses now maintain an extensive electronic infrastructure including a complex combination of software applications, database engines, hardware platforms, and networking technologies. However, there is commonly a significant problem in sharing data between applications and databases across a network because many software elements use proprietary formats. This problem exists when sharing data within a single business, as well as between different businesses. There are many problems when attempting to integrate data stored in these independent and heterogeneous databases.

Information has previously been stored in distributed data sources. A number of enterprise application integration (EAI) tools are known for performing automated application-to-application integration in order to create focused applications composed of information stored in distributed data sources. These traditional EAI tools focus on integration that duplicates data in two or more systems which can result in consequent data synchronization problems. However, duplication of data requires that data be physically copied to a new location which can result in problems because of duplication of information that can become inconsistent when data is changed in one location. Accordingly, it is undesirable to duplicate data in order to provide an integrated view.

Applications exist for accessing multiple, disparate databases. However, these techniques have required the inclusion of substantial logic within client applications in order to access and integrate the retrieved data. This logic is frequently duplicated in many client applications that need access to the same disparate data.

Figure 1:
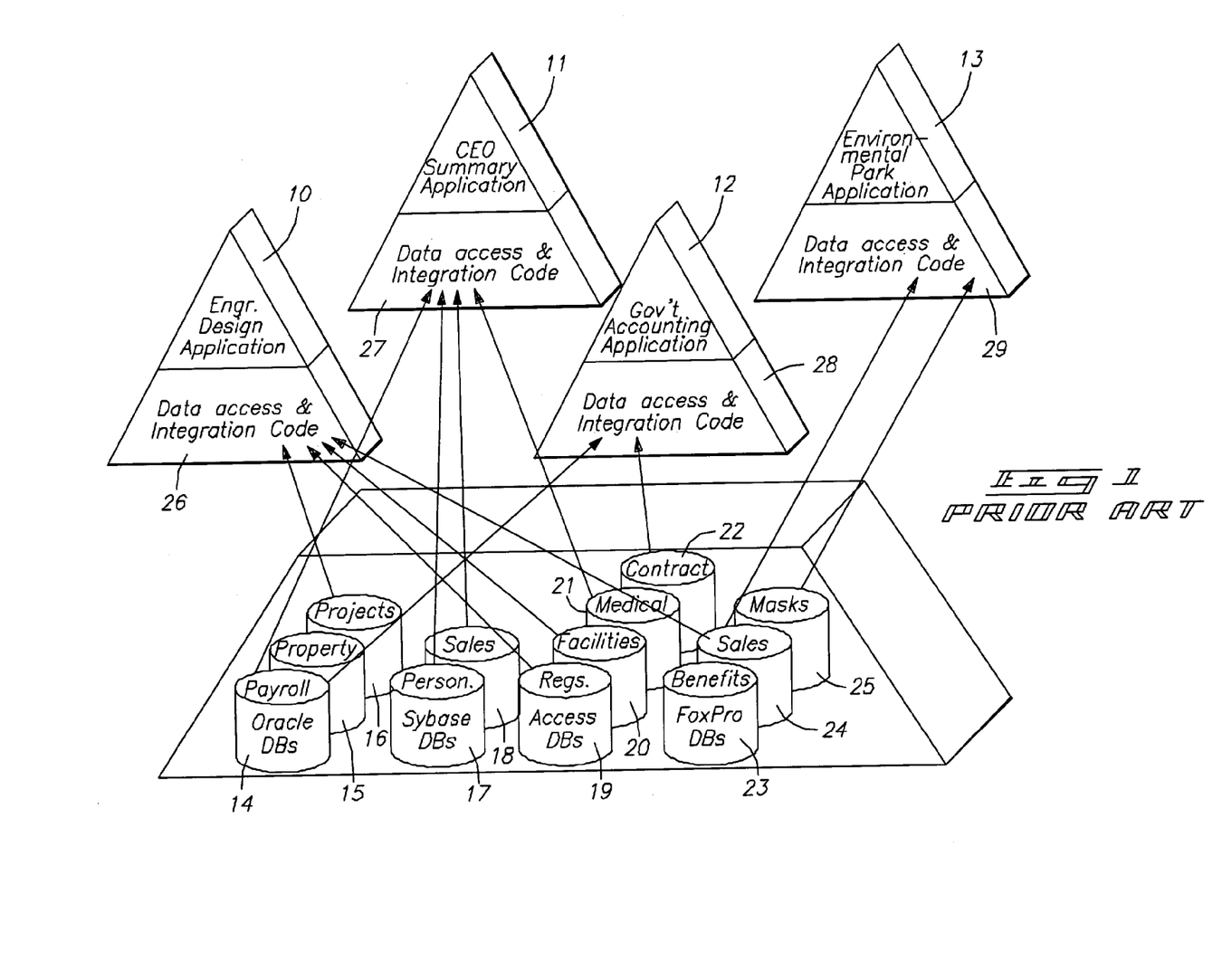
FIG. 1 is a simplified graphical representation of a prior art distributed data system having a configuration of applications that access multiple data sources via an interface for various modules.

For example, FIG. 1 illustrates a typical configuration of applications 10–13 that access multiple data sources 14–25. This configuration is highly likely to cause long-term problems with inconsistent results and poor maintainability of the applications 10–13. There is a potential for conflict to exist between the algorithms 26–29 that integrate data because logic is duplicated or rewritten for each client application. Additionally, if a change is made to the underlying data source structure, the change needs to be reflected in every client application that utilizes that data element. This can be a very tedious, time-consuming, and error-prone endeavor. For example, a change may entail restructuring a database table or converting a FoxPro® database 23 to an Oracle® database 14.

SUMMARY OF THE INVENTION

The present invention provides a knowledge base toolkit for a distributed data system that enables relatively easy entry and/or modification of knowledge pieces in appropriate knowledge bases.

According to one aspect, a system is provided for managing user entry and/or modification of knowledge information into a knowledge base file having an integrator support component and a data source access support component. The system includes processing circuitry, memory, a user interface, and a knowledge base toolkit. The memory communicates with the processing circuitry and is configured to store at least one knowledge base. The user interface communicates with the processing circuitry and is configured for user entry and/or modification of knowledge pieces within a knowledge base. The knowledge base toolkit is configured for converting knowledge in at least one knowledge base from a first knowledge base form into a second knowledge base form.

According to another aspect, a method is provided for translating knowledge information into a knowledge base having an integrator component and a data source access component. The method includes: providing a knowledge base toolkit for generating code into a desired knowledge base format having a desired syntax from a source of knowledge information; receiving user input at the knowledge base toolkit via an interface comprising at least one of user entry of knowledge information and user modification of knowledge information; and with the knowledge base toolkit, converting the user input knowledge information from a first knowledge base format into a second knowledge base format having a specific syntax that is compatible with a desired data integration distributed application suite.

According to yet another aspect, a knowledge information toolkit is provided including a user interface, a storage device, and a translator. The user interface is configured for receiving user input comprising at least one of entry of knowledge information and modification of knowledge information. The storage device communicates with the user interface and is configured to store a knowledge base. The translator includes an integrator support component and a data source access support component configured to convert knowledge in at least one knowledge base from a first knowledge base format into a second knowledge base format having a specific syntax compatible with a data integration program.

One advantage is provided by a toolkit that enables the conversion of knowledge in at least one knowledge base from a first knowledge base form into a second knowledge base form.

BRIEF DESCRIPTION OF THE DRAWINGS

Preferred embodiments of the invention are described below with reference to the accompanying drawings, which are briefly described below.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Reference will now be made to a preferred embodiment of Applicants' invention. One exemplary implementation is described below and depicted with reference to the drawings comprising a system and method for integrating data from disparate and distributed data sources. More particularly, the present invention relates to toolkits and methods for entering and/or modifying the knowledge for integrating disparate and distributed data sources independent of the platform or domain of the systems. While the invention is described by way of a preferred embodiment, it is understood that the description is not intended to limit the invention to such embodiment, but is intended to cover alternatives, equivalents, and modifications which may be broader than the embodiment, but which are included within the scope of the appended claims.

In an effort to prevent obscuring the invention at hand, only details germane to implementing the invention will be described in great detail, with presently understood peripheral details being incorporated by reference, as needed, as being presently understood in the art.

For purposes of this disclosure, the term "Merlin" is understood to refer to a suite of distributed applications that communicate with each other, that perform access to a distributed data base, that perform data integration and fusion on the data retrieved, and that present the integrated and fused data as if it came from one database. More particularly, Merlin is a data integration distributed application suite for performing data integration. Further details of Merlin are disclosed in The INEEL Data Integration Mediation System, by Bhujanga Panchapagesan, Joshua Hui, and Gio Wiederhold, Stanford University; Stephen Erickson; ISX Corporation; Lynn Dean and Antoinette Hempstead, May 1997, incorporated herein by reference.

Figure 2:
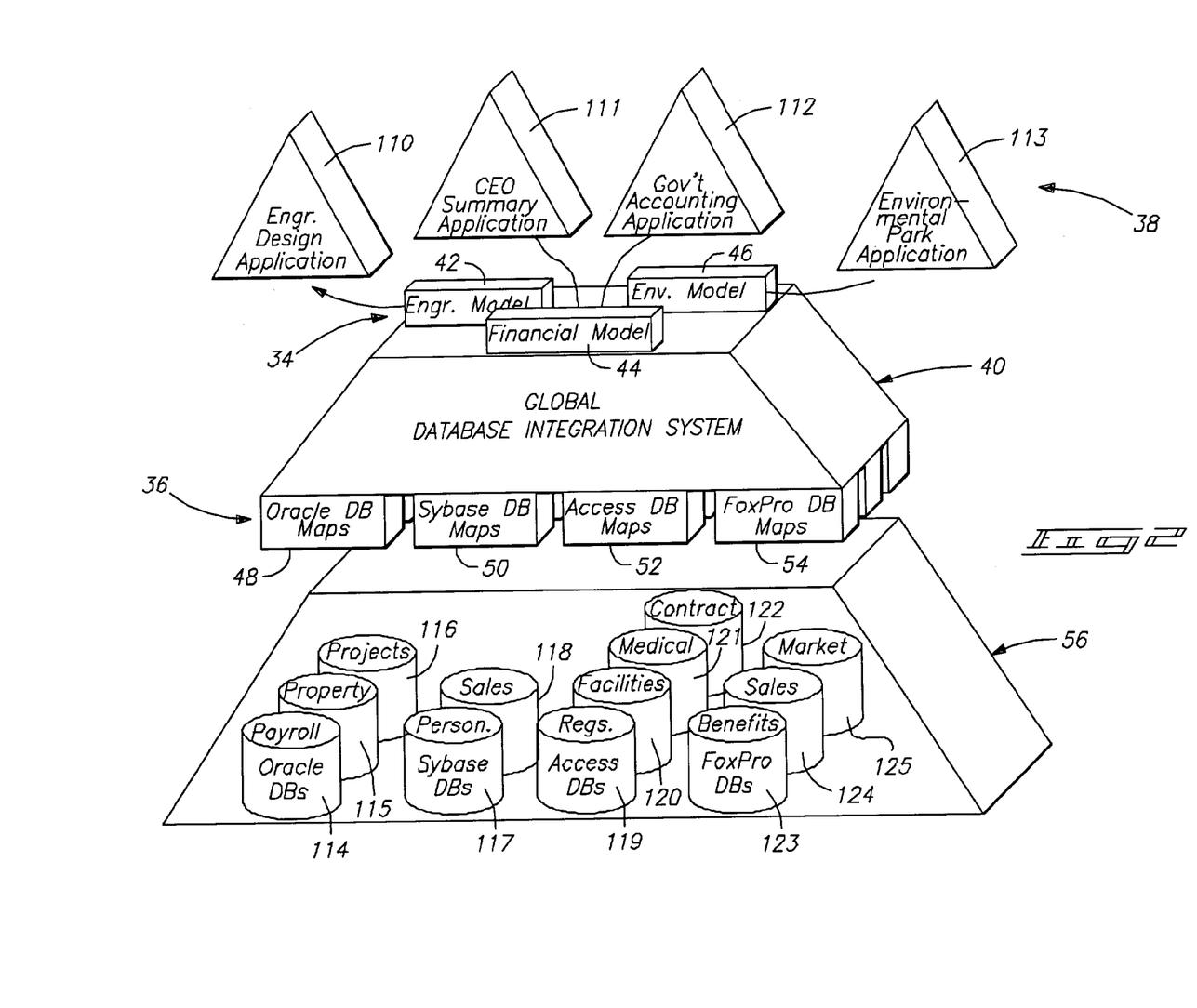
FIG. 2 is a simplified graphical representation of a distributed data system having an integrated data system for sharing data between applications and independent and heterogeneous databases across a network.

FIG. 2 illustrates a database integration system 40, hereinafter referred to as Merlin. More particularly, applications 110–113 within application layer 38 are configured to access multiple data sources 114–125 by way of global database integration system 40, also referred to as Merlin. The middle layer of system 40 provides models 42, 44 and 46, wherein applications 110–113 rely on the data integration provided by models 42, 44 and 46. Merlin 40 also provides database maps, such as maps 48, 50, 52 and 54. As used herein, a map is understood to be a set of data that has a corresponding relationship to another set of data.

Application layer 38 includes an engineering design application 110, a CEO summary application 111, a Government accounting application 112, and an environmental park application 113, according to one construction. Associated with global database integration system 40 is object model data layer 34 which includes an engineering model 42, a financial model 44, and an environmental model 46. Financial model 44 is shared by applications 111 and 112. Further associated with global database integration system 40 is a data source mapping layer 36 which includes a plurality of database maps including a set of Oracle® database maps 48, a set of Sybase® database maps 50, a set of Access database maps 52, and a set of FoxPro® database maps 54.

Virtual object database 56 includes three Oracle® databases, two Sybase® databases, four Access databases, and three FoxPro® databases. More particularly, the Oracle® databases include payroll databases 114, property databases 115, and projects databases 116. The Sybase® databases include personnel databases 117 and sales databases 118. The Access databases include regulations databases 119, facilities databases 120, medical databases 121, and contract databases 122. Finally, the FoxPro® databases include benefits databases 123, sales databases 124, and market databases 125.

As shown in FIG. 2, Merlin 40 provides a solution to chaos that is inherent in the configuration shown in FIG. 1. More particularly, Merlin separates both the data access and the integration logic into a middle layer that accepts domain-specific details from object models within layer 34 and data mappings in layer 36. These domain-specific details are then input into Merlin as data, thereby creating an environment in which data source changes or client model changes are easily communicated to the Merlin system.

FIG. 2 illustrates the Merlin architecture and how Merlin can service any number of client applications, each of which has its own data access and integration requirements. In contrast with the difficulties discussed with reference to FIG. 1, Merlin provides an environment in which applications that require the same data integration can rely on consistent results returned by Merlin because the applications can share a common model. For example, Applications 111 and 112 both share financial model 44 as shown in FIG. 2. Additionally, maintainability of applications that utilize Merlin is greatly improved because Merlin absorbs data access changes, thus requiring no changes to the client application.

Merlin provides several unique features. First, data instance integration is provided, in addition to direct schema integration. Secondly, Merlin enables inconsistency resolution. Thirdly, domain independence is included. Fourth, Merlin enables the creation of a virtual object-oriented database from a data model. Fifth, Merlin uses a component architecture implementation. Sixth, an N-tiered architecture based on mediator technology is provided. Seven, Merlin enables the transformation of fragmented data into information objects. Eight, each query results in one integrated response. Nine, Merlin provides an automatic handling of query decomposition. Ten, Merlin provides client application independence. Eleven, Merlin provides platform and operating system independence.

Merlin mediation system (Merlin) comprises an intelligent data integration tool developed to solve data access and integration issues associated with distributed data sources. Such tool is presently publicly available from Bechtel BWXT Idaho, LLC, of Idaho Falls, Id. The present invention is a knowledge based toolkit that further enhances the features of Merlin. Accordingly, details of Merlin will be described herein sufficient to generate an understanding of how the knowledge based toolkit interacts with and enhances Merlin.

Merlin has an architecture that assists software developers when building query, reporting, and analysis programs. Object technology is used to create a virtual database and provide seamless integration of information that is retrieved from existing systems. All this is achieved without requiring additional databases or the retrofitting of an existing system. Accordingly, Merlin provides a virtual database that is independent of operating systems, platforms, and user applications.

The present data integration tool is a domain-independent implementation of a mediator that performs intelligent integration of information. The original concept for using mediators to perform intelligent integration of information was formalized by Dr. Gio Widerhold of Stanford University while he was the original program manager of the Defense Advanced Research Projects Agency (DARPA) Intelligent Integration of Information (I3) project. Assignees of the present invention partnered with Stanford University and Dr. Gio Widerhold in the development of the original prototype of Merlin.

Merlin comprises a specific implementation of intelligent middleware that resolves data access and integration issues. Such middleware resides between client applications in layer 38 and their independent data sources in the layer provided by virtual object database 56. A client application, such as applications 110–113 in FIG. 2, may be invoked via a web browser or it may reside on an individual's workstation. The data sources, such as databases 114–125 of FIG. 2, can reside on multiple, separate, heterogeneous computer platforms and may be recorded in a variety of database formats. Merlin is configured to create a virtual object database 56 in order that user applications view the data retrieved from the various sources as though it were returned from a single, integrated database. Additionally, Merlin provides advanced data instance integration capabilities such as object unification and fusion, abstraction, aggregation, and data and schema translation.

Merlin is not bound to any single user application nor to any specific data sources. The software components utilize a combination of mediator and expert system technologies in order to ensure adaptability for use by various disciplines. These software components accept domain-specific details (e.g., schema, mappings, expert system rules) as data from a knowledge base. This enables the same software to be used for a variety of domains and user applications with no source code modifications or recompilations being required.

With the advent of the Internet and client/server computing, data sources have become extremely decentralized and mainframes are less frequently used as a single data repository. Such decentralization can result in multiple, conflicting data sources, many residing in a heterogeneous environment. This contributes to instances where similar reports may be developed and distributed to customers with data that cannot be correlated because the information was gathered from multiple sources. Merlin was developed in order to address these issues. Merlin provides an alternative path forward in the event that redesigning the databases and eliminating the redundant data proves to be cost- and/or time-prohibitive. Users can continue to use existing systems for routine functions of add, change and delete. In the case of query, reporting, and data analysis, Merlin integrates the disparate data sources for the user by pulling fragmented data, or data instances, together, resolving data conflicts, and transforming the data into information objects.

Figure 3:
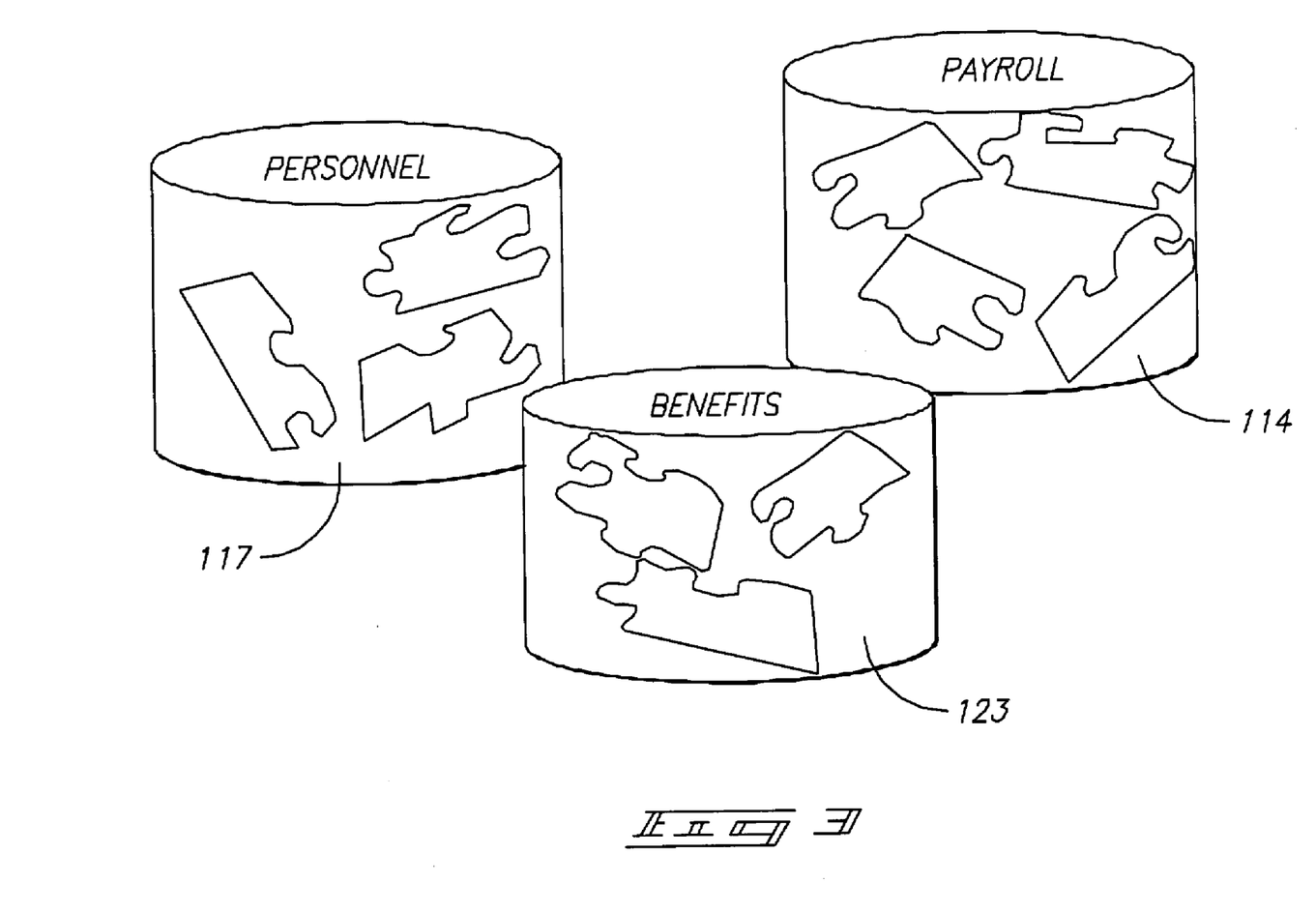
FIG. 3 is a simplified graphical representation of a data source view depicting different instances of data spread across multiple heterogeneous databases.

FIG. 3 illustrates several different instances of data spread across multiple heterogeneous databases. Personnel database 117 represents an instance of data from the Sybase® databases. Payroll database 114 represents an instance of data from the Oracle® databases. Benefits database 123 represents an instance of data from the FoxPro® databases. As shown, these databases are a mixture of different database management systems, although this is not necessary. For example, database 114 is shown as an Oracle® database management system, database 117 is shown as a Sybase® database management system, and database 123 is shown as a Microsoft® (MS) Access database management system. Oracle® database management system (DBMS) is available from Oracle Corporation, of Redwood Shores, Calif. http://www.oracle.com. Sybase® databases are available from Sybase, Inc., of Emeryville, Calif., originally known for SQL Server relational DBMS, but also includes PowerBuilder application development software. Microsoft® Access is a database program for Windows, available from Microsoft Corporation, of Redmond, Wash., and available separately or included in the Microsoft Office suite.

For purposes of illustration, assume that an individual's personnel and medical benefits data is spread across multiple databases. A data source view is shown in FIG. 3 comprising data for one individual. It is also assumed that each of the personnel database 117, the benefits database 123, and the payroll database 114 is located on different computer platforms, and each utilizes different database management systems.

Figure 4:
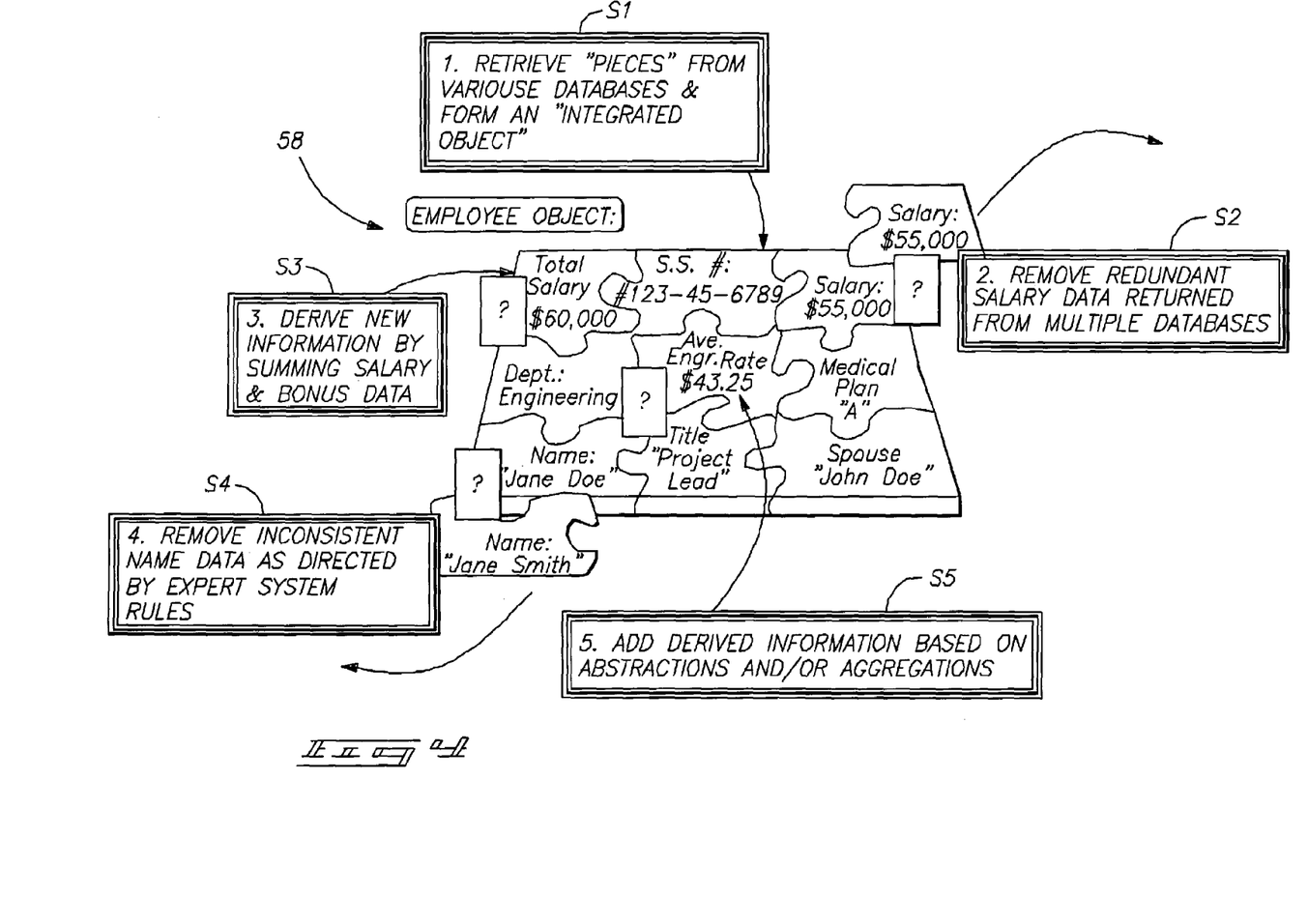
FIG. 4 is a simplified graphical representation illustrating the integration processes performed on the retrieved data instances to provide a user application with a single, integrated result based on disparate data.

FIG. 4 depicts the integration process that Merlin performs on retrieved data instances in order to provide a user application with a single, integrated result based on the disparate data. More particularly, Merlin implements a data integration process that accesses each of the three databases from FIG. 3 and integrates the fragmented data into a unified object 58 via Step "S1". Merlin also removes redundant data via Step "S2" that was retrieved from multiple databases and identifies and/or resolves data inconsistencies via Step "S4", such as personnel name mismatches. Additionally, Merlin has the capability to create virtual attributes that do not actually exist in any database, but can be derived from existing data or schema information via Step "S3". Derived information can be added via Step "S5". Although the example presented in FIGS. 3 and 4 only includes data for one individual, Merlin can perform this functionality on large sets of records.

Figure 5:
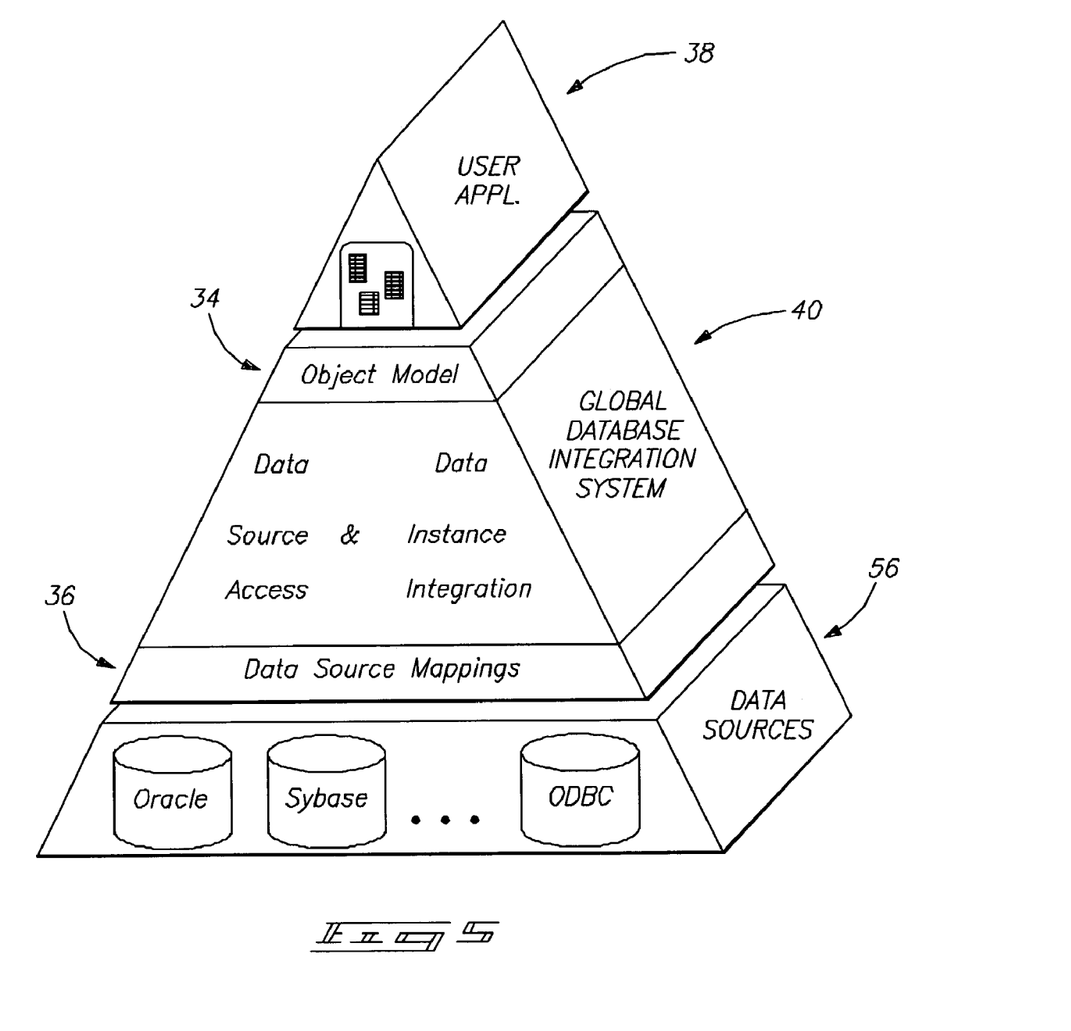
FIG. 5 is a simplified graphical representation illustrating the architecture for the distributed data system of FIG. 2.

FIG. 5 illustrates the architecture used by the global database integration system, or Merlin 40. More particularly, Merlin 40 relies on object model data within layer 34 and data source mappings within layer 36 in order to define the specific domain that it operates within. As shown in FIG. 5, Merlin is shown within a three-tiered client/server architecture comprising user application layer 38, Merlin 40, and data sources (or virtual object databases) layer 56. Multiple heterogeneous data sources can reside either on the same or on distributed computer platforms. It also needs to be stressed that multiple user applications can utilize Merlin with customized object models in order to retrieve personalized views of the integrated data as illustrated by FIG. 5.

Merlin differs from other presently available systems in that Merlin performs data instances integration along with schema integration, whereas the other systems only perform schema integration. Schema integration occurs when attributes for a single object or entity are presented as if they were from a single source even though they may actually reside in multiple sources. However, each individual attribute needs to be retrieved from only one source.

For example, with the system of FIG. 1 employee name will always be retrieved from the Payroll database while profession will be retrieved from the Personnel database and medical plan will be retrieved from the Benefits database. Since employee name actually resides in both the Personnel and Payroll databases, a schema integration package needs to be instructed to access employee name from the Payroll database only and ignore the Personnel database. With Merlin and its data instances integration capability, employee name can be retrieved from both databases.

In addition to also providing for schema integration, Merlin has the capability to perform data instances integration. If Merlin has the same attribute mapped to multiple sources, it will look at the data instances retrieved from each source and check the information in order to determine if it is the same information. For example, employee name can be mapped to the Payroll database and the Personnel database, as discussed above. If the attribute is the same, Merlin will populate the single attribute with the information as if it came from only one source. If the information is not the same, Merlin allows for two options. First, Merlin can be instructed to tell the client application that inconsistent data has been retrieved for a single attribute and to identify the sources of the inconsistent data. Secondly, Merlin also has the ability to use expert system rules in order to resolve the inconsistency automatically and present the resolved information whenever the attribute is requested.

Merlin has a distributed data system architecture. Merlin provides a domain-independent and intelligent data integration tool, that solves data access and integration issues associated with distributed data sources. An active layer is created between client applications and data sources. This layer, referred to as the semantic layer, includes knowledge about the data sources that are involved. The knowledge includes business rules and corporate information that determine how the data should be interpreted, as well as the ways in which data from various sources may interrelate and should be integrated. By placing such data in the context of this knowledge, Merlin provides consistent answers regardless of who is asking the question, or the manner in which a question is asked.

The software components within Merlin adapt to various disciplines because they accept domain-specific details as data from a knowledge base. For example, schema, mappings, and expert system rules provide such domain-specific details. Such adaptability enables the same software to be used for a wide variety of domains and client applications without necessarily requiring source code modifications or recompilations.

Merlin provides a layered view of the distributed data system provided by Merlin. Merlin can be instructed to tell a client application that inconsistent data has been retrieved for a single attribute and to identify the sources of the inconsistent data. Additionally, an ability is provided to use expert system rules to resolve the inconsistency automatically and to present the resolved information whenever the attribute is requested.

Figure 6:
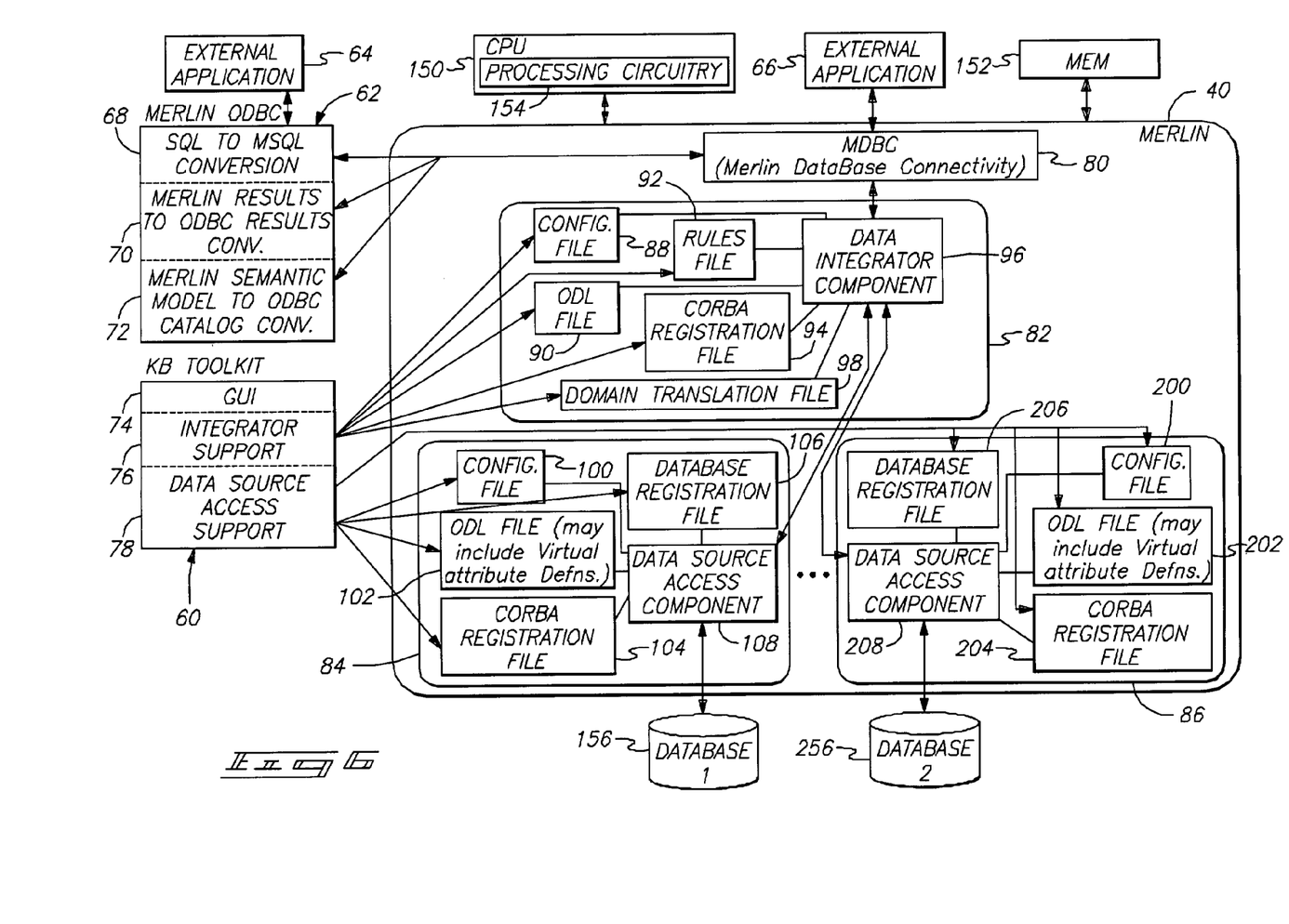
FIG. 6 is a block diagram illustrating a knowledge base toolkit implemented with the distributed data system architecture illustrated by FIG. 5.

FIG. 6 illustrates the incorporation of a new knowledge base toolkit 60 within global database integration system 40 of Merlin. Merlin incorporates knowledge base toolkit 60 in order to provide the enhancements claimed herein and described below.

More particularly, Merlin 40 relies on its knowledge bases 82, 84 and 86 in order to provide domain-specific details that are used at run-time. The two components that require knowledge base information are the integrator support component 76 and the data source access support component 78. The knowledge bases for the integrator support component 76 and the data source access support component 78 are comprised of a number of different types of knowledge. The Merlin knowledge base toolkit (KB Toolkit) 60 enables the capability to relatively easily enter and/or modify the various knowledge pieces in the appropriate knowledge bases 82, 84, and 86. The collective Merlin knowledge base is made up of a series of flat files.

The purpose of the object model information within the Integrator (or data integrator) knowledge base is to define the objects in the integrated view to be presented to the client application. When defining the objects, both the attributes within each object and the relationships between the various objects must also be identified. The Merlin knowledge base toolkit 60 takes the information entered by the user into a graphical user interface (GUI) 74, translates it into the necessary Object Definition Language (ODL) syntax (including relationship extensions), and stores it in the appropriate flat file, such as file 90. Accordingly, integrator object model definition is provided by the knowledge base toolkit 60.

The purpose of the inconsistency resolution information within the integrator support component of the knowledge base is to define how data inconsistencies should be handled by Merlin 40. The Merlin knowledge base toolkit 60 takes the information entered by the user into the GUI 74, translates it to the necessary C Language Integrated Production System (CLIPS) rules, and stores it in the appropriate flat file, such as file 92. Accordingly, integrator inconsistency resolution rules definition is provided by the knowledge base toolkit 60.

The purpose of the object model information within the data source access support component of the knowledge base is to define the objects and attributes for which a specific data source will be providing the data. When defining the objects and the attributes, the data source mappings (i.e., the specific data source table and field from which the data is retrieved) must be provided, along with any join information if an object is created from data retrieved from multiple tables. The Merlin knowledge base toolkit 60 takes the information entered by the user into the graphical user interface (GUI) 74, translates it into the necessary ODL syntax (including mapping extensions), and stores it in the appropriate flat file, such as files 102 and 202. Accordingly, data source access object model definition is provided by the knowledge base toolkit 60.

As used herein, the term "virtual attributes" refers to attributes that do not actually reside in a data source but are derived from literals, other "real" attributes, or a combination of both. Virtual attributes can be used for such functions as: (1) performing unit conversions on "real" attributes (e.g., converting attribute stored in pounds to kilograms); (2) joining multiple attributes into one (e.g., combining stored last name and first name into full name attribute); and (3) separating a single attribute into multiple attributes (e.g., separating stored full name attribute into last name attribute and first name attribute).

Virtual attributes are a powerful mechanism that allows Merlin to return the data to the end-user based on business needs rather than on how the data is actually stored. The Merlin knowledge base toolkit 60 provides a mechanism for the user to define simple to complex virtual attributes using GUI 74. The knowledge base toolkit 60 takes the entered information, translates it into the necessary Very Small Interpreter (VSI) language, and stores it within the ODL knowledge base.

As referred to herein, configuration files include the following for the integrator support component 76: (1) Configuration File 88—path specifications for where the other knowledge base files are located and the specification of what Data Source Access servers the Integrator component will attach to; and (2) Common Object Request Broker Architecture (CORBA) Registration File 94—a batch/script file that contains the commands to "register" an Integrator server within the CORBA environment.

Configuration files include the following for the data source access support component 78: (1) Configuration File 100 and 200—path specifications for where the other knowledge base files are located; (2) CORBA Registration File 104 and 204—a batch/script file that contains the commands to "register" a Data Source Access server within the CORBA environment; and (3) Database Registration File 106 and 206—the username and encrypted password combination for access to a specific data source.

Domain translations via domain translation file 98 are used only within the integrator support component 76. Domain translation allows an Integrator to have a slightly different object model than its associated data source access support components 78 have. Domain translation functionality actually overlaps to some extent with virtual attributes—whereas virtual attributes handle the manipulation of table/column data, domain translations handle the manipulation of the data source access objects and attributes to a form that is recognizable by the Integrator. Although there are future plans for enhancing the knowledge base toolkit 60 to include the definition and modification of domain translations, the knowledge base toolkit 60 does not currently include this capability due to the infrequency of use of the domain translation functionality.

In order to allow access to Merlin 40 from a variety of applications that utilize the Open Database Connectivity (ODBC) standard, an ODBC driver 62 for Merlin is included. This ODBC driver sits between a client application, or external application, 64 and a Merlin Database Connectivity (MDBC) component 80. The MDBC component 80 accepts queries and returns results in a structured manner. In order for queries to be accepted and results returned according to the ODBC standard, three translations are performed.

A first translation entails a conversion of ODBC SQL to MSQL, identified by reference numeral 68 in FIG. 6. The ODBC standard complies with the Structured Query Language (SQL) standard; however, due to Merlin's object structures, Merlin could not utilize SQL exactly. Therefore, an extension to SQL was created; this extension was named Merlin Structured Query Language (MSQL). MSQL provides the capability of defining queries that take advantage of Merlin's nesting capabilities via the Merlin relationships. An algorithm was developed that allowed for the translation from ODBC SQL to Merlin's MSQL so that the query could be passed onto the MDBC component.

A second translation entails a conversion of MDBC results to ODBC results, identified by reference numeral 70 in FIG. 6. The ODBC standard specifies that query results should be returned in a specific manner via specific functions. The MDBC component returns its results in a structured format defined in its Object Request Broker (ORB) Interface Definition Language (IDL) file. In order to convert the results from the MDBC result structure to the ODBC result structure, several algorithms were created. Multiple algorithms were needed because ODBC requires multiple method calls to return all the information that MDBC returns in its result structure.

A third translation entails a conversion of MDBC Semantic Model to ODBC Catalog Information, identified by reference numeral 72 in FIG. 6. The ODBC standard specifies that catalog information (i.e., meta-data) should be returned in a specific manner via specific functions. The MDBC component returns its semantic model (i.e., meta-data) in a proprietary structure format defined in its Object Request Broker (ORB) Interface Definition Language (IDL) file. In order to convert the meta-data from the MDBC semantic model structure to the ODBC catalog structure, several algorithms were created. Multiple algorithms were needed because ODBC requires multiple method calls to return all the information that MDBC returns in its semantic model structure.

Also according to FIG. 6, knowledge base 82 includes a data integrator component 96 that communicates with data source access components 108 and 208. MDBC 80 also communicates with an external application 66 which can be the same or different than external application 64. Data source access components 108 and 208 communicate directly with databases 156 and 256.

As shown in FIG. 6, Merlin 40 is implemented on a computer system including a central processing unit (CPU) 150 and memory 152. CPU 150 includes processing circuitry 154. The memory communicates with the processing circuitry and is configured to store at least one knowledge base. According to one construction, Merlin 40 provides a system for managing user entry/modification of knowledge information into a knowledge base file having an integrator support component 76 and a data source access support component 78. The user interface 74 communicates with the processing circuitry 154 and is configured for user entry/modification of knowledge pieces within a knowledge base. Knowledge base toolkit 60 is provided for converting knowledge in at least one knowledge base from a first knowledge base form into a second knowledge base form.

In one case, the knowledge base comprises an integrator knowledge base. In one limiting aspect, the integrator knowledge base comprises object model information that defines objects in an integrated view for presentation to a client application. In a further limiting aspect, the knowledge base toolkit receives information entered by a user via the user interface, translates the information into an object definition language (ODL) syntax for the integrator knowledge base, and stores the ODL syntax in a respective flat file. Optionally or additionally, the knowledge base toolkit takes information entered by a user via the user interface, translates the information into C language integrated production system (CLIPS) rules for the integrator knowledge base, and stores the CLIPS rules in a respective flat file format.

In one case, the integrator knowledge base comprises a configuration file. In another case, the integrator knowledge base comprises a Common Object Request Broker Architecture (CORBA) registration file. In yet another case, the knowledge base comprises a data source access knowledge base. In even another case, the data source access knowledge base comprises a configuration file. In a further case, the data source access knowledge base comprises a CORBA registration file. In a yet further case, the data source access knowledge base comprises a database registration file. In even further variations, the knowledge base toolkit takes information entered by a user via the user interface, translates the information into an object definition language (ODL) syntax for the data source access knowledge base, and stores the ODL syntax in a respective flat file. In another variation, the knowledge base toolkit takes information entered by a user via the user interface, translates the information into a very small interpreter (VSI) language, and stores the VSI translated information within an object definition language (ODL) knowledge base.

Furthermore, the knowledge base toolkit in one case enables a user via the user interface to define a range of simple to complex virtual attributes, wherein virtual attributes comprise attributes that do not reside in a data source, but are derived from literals, other real attributes, or a combination of literals or other real attributes. According to another aspect, the knowledge base toolkit enables a user, through input of a user interface, to translate an object model from an associated data source access component into a form having a specific syntax that is recognized by the integrator support component. In one case, the knowledge base toolkit has a domain translation capability that stores the domain translation syntax in a respective flat file.

It is further understood that a corresponding method is also provided for translating knowledge information into a knowledge base having an integrator component and a data source access component. One step of the method includes providing a knowledge base toolkit for generating code into a desired knowledge base format having a desired syntax from a source of knowledge information. Another step includes receiving user input at the knowledge base toolkit via an interface comprising at least one of user entry of knowledge information and user modification of knowledge information. A further step includes, with the knowledge base toolkit, converting the user input knowledge information from a first knowledge base format into a second knowledge base format having a specific syntax that is compatible with a desired data integration distributed application suite.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A system for managing user entry/modification of knowledge information into a knowledge base file having an integrator support component and a data source access support component, comprising:
   processing circuitry;
   memory communicating with the processing circuitry and configured to store at least one knowledge base comprising a data source access knowledge base;
   a user interface communicating with the processing circuitry and configured for user entry/modification of knowledge pieces within a knowledge base; and
   a knowledge base toolkit that takes information entered by a user via the user interface, translates the information into a very small interpreter (VSI) language, and stores the VSI translated information within an object definition language (ODL) knowledge base, the knowledge base toolkit enables a user via the user interface to define a range of simple to complex virtual attributes, wherein virtual attributes comprise attributes that do not reside in the data source, but are derived from literals, other real attributes, or a combination of literals or other real attributes.

2. The system of claim 1 wherein the at least one knowledge base comprises an integrator knowledge base.

3. The system of claim 2 wherein the integrator knowledge base comprises object model information that defines objects in an integrated view for presentation to a client application.

4. The system of claim 3 wherein the knowledge base toolkit receives information entered by a user via the user interface, translates the information into an object definition language (ODL) syntax for the integrator knowledge base, and stores the ODL syntax in a respective flat file.

5. The system of claim 2 wherein the knowledge base toolkit takes information entered by a user via the user interface, translates the information into C language integrated production system (CLIPS) rules for the integrator knowledge base, and stores the CLIPS rules in a respective flat file format.

6. The system of claim 2 wherein the knowledge base toolkit takes information entered by a user via the user interface, translates the information into a configuration syntax for the integrator knowledge base, and stores the configuration syntax in a respective flat file format.

7. The system of claim 2 wherein the knowledge base toolkit takes information entered by a user via the user interface, translates the information into a Common Object Request Broker Architecture (CORBA) syntax for the integrator knowledge base, and stores the CORBA syntax in a respective flat file.

8. The system of claim 1 wherein the knowledge base toolkit takes information entered by a user via the user interface, translates the information into a configuration syntax for the data source access knowledge base, and stores the configuration syntax in a respective flat file format.

9. The system of claim 1 wherein the knowledge base toolkit takes information entered by a user via the user interface, translates the information into a Common Object Request Broker Architecture (CORBA) syntax for the data source access knowledge base, and stores the CORBA syntax in a respective flat file.

10. The system of claim 1 wherein the knowledge base toolkit takes information entered by a user via the user interface, translates the information into a database registration syntax for the data source access knowledge base, and stores the database registration syntax in a respective flat file format.

11. The system of claim 1 wherein the knowledge base toolkit takes information entered by a user via the user interface, translates the information into an object definition language (ODL) syntax for the data source access knowledge base, and stores the ODL syntax in a respective flat file.

12. The system of claim 1 wherein the knowledge base toolkit enables a user via the user interface to translate an object model from an associated data source access component into a form having a specific syntax that is recognized by the integrator support component.

13. The system of claim 12 wherein the knowledge base toolkit has a domain translation capability that stores the domain translation syntax in a respective flat file.

14. A method for translating knowledge information into a knowledge base having an integrator component and a data source access component, comprising:
   providing processing circuitry, memory communicating with the processing circuitry and configured to store at least one knowledge base comprising a data source access knowledge base, and a knowledge base toolkit for generating code into a desired knowledge base format having a desired syntax from a source of knowledge information;

receiving user input at the knowledge base toolkit via an interface comprising at least one of user entry of knowledge information and user modification of knowledge information; and with the knowledge base toolkit, converting the user input knowledge information from a first knowledge base format into a second knowledge base format having a second syntax that is compatible with a desired data integration distributed application suite;

converting the user input knowledge information comprises translating the information into a very small interpreter (VSI) language and storing the very small interpreter (VSI) translated information within an object definition language (ODL) knowledge base; and via the interface, defining a range of simple to complex virtual attributes the virtual attributes comprising attributes that do not reside in a data source, but are derived from literals, other real attributes, or a combination of literals or other real attributes.

15. The method of claim 14 wherein receiving user input comprises providing a user interface communicating with processing circuitry and memory for storing at least one knowledge base and entering knowledge pieces within a knowledge base of the at least one knowledge base.

16. The method of claim 14 wherein receiving user input comprises providing a user interface communicating with processing circuitry and memory for storing at least one knowledge base and modifying knowledge pieces within a knowledge base of the at least one knowledge base.

17. The method of claim 14 wherein receiving user input comprises a user entering knowledge information via the interface.

18. The method of claim 14 wherein receiving user input comprises a user modifying knowledge information via the interface.

19. The method of claim 14 further comprising reading the user input knowledge information from memory, before converting the user input knowledge information.

20. The method of claim 14 wherein the knowledge base comprises an integrator knowledge base.

21. The method of claim 20 wherein the integrator knowledge base comprises object model information and further comprising defining objects in an integrated view.

22. The method of claim 21 wherein converting the user input knowledge information comprises translating the user input knowledge information into the second knowledge base format in an object definition language (ODL) syntax, and further comprising storing the ODL syntax in a respective flat file.

23. The method of claim 20 wherein converting the user input knowledge information comprises translating the information into a configuration syntax for the integrator knowledge base, and further comprising storing the configuration syntax in a respective flat file format.

24. The method of claim 20 wherein converting the user input knowledge information comprises translating the information into a Common Object Request Broker Architecture (CORBA) syntax for the integrator knowledge base, and further comprising storing the CORBA syntax in a respective flat file format.

25. The method of claim 14 wherein converting the user input knowledge information comprises translating the information into a configuration syntax for the data source access knowledge base, and further comprising storing the configuration syntax in a respective flat file format.

26. The method of claim 14 wherein converting the user input knowledge information comprises translating the information into a Common Object Request Broker Architecture (CORBA) syntax for the data source access knowledge base, and further comprising storing the CORBA syntax in a respective flat file format.

27. The method of claim 14 wherein converting the user input knowledge information comprises translating the information into a database registration syntax for the data source access knowledge base, and further comprising storing the database registration syntax in a respective flat file format.

28. The method of claim 14 wherein converting the user input knowledge information comprises translating the information into an object definition language (ODL) syntax for the data source access knowledge base and storing the object definition language (ODL) syntax in a respective flat file.

* * * * *